United States Patent [19]
Bikson et al.

[11] Patent Number: 5,160,042
[45] Date of Patent: Nov. 3, 1992

[54] DOUBLE ENDED HOLLOW FIBER BUNDLE AND FLUIDS SEPARATION APPARATUS

[75] Inventors: Benjamin Bikson, Brookline; Salvatore Giglia, Norwood, both of Mass.

[73] Assignee: Praxair Technology, Inc., Danbury, Conn.

[21] Appl. No.: 787,898

[22] Filed: Nov. 5, 1991

[51] Int. Cl.⁵ .............................................. B01D 63/02
[52] U.S. Cl. .......................... 210/321.8; 210/321.89; 210/500.23
[58] Field of Search .................. 210/500.23, 321.78, 210/321.79, 321.8, 321.87, 321.88, 321.89

[56]     References Cited
U.S. PATENT DOCUMENTS

| | | | |
|---|---|---|---|
| 3,536,611 | 10/1970 | DeFilippi et al. | 210/22 |
| 4,080,296 | 3/1978 | Clark | 210/323 |
| 4,293,419 | 10/1981 | Sekino et al. | 210/321.1 |
| 4,622,143 | 11/1986 | Edwards | 210/321.1 |
| 4,707,267 | 11/1987 | Johnson | 210/650 |
| 4,781,834 | 11/1988 | Sekino et al. | 210/321.88 |
| 4,865,736 | 9/1989 | Coplan | 210/321.79 |
| 4,880,440 | 11/1989 | Perrin | 210/500.73 |
| 4,881,955 | 11/1989 | Bikson et al. | 55/16 |

*Primary Examiner*—Frank Sever
*Attorney, Agent, or Firm*—Alvin H. Fritschler

[57]     ABSTRACT

An annular double ended hollow fiber bundle, a fluid separation apparatus comprising the annular double ended hollow fiber bundle having bores open at both ends of the hollow fibers embedded in the two tubesheets enclosed in a shell having multiple ports, a fluid entrance port, a non-permeate exit port and at least one permeate exit port, wherein said double ended hollow fiber bundle is encased in an essentially impermeable film barrier except for entrance regions situated in selected areas between the tubesheets and to processes for separating fluids mixtures.

29 Claims, 5 Drawing Sheets

DOUBLE ENDED HOLLOW FIBER BUNDLE AND FLUIDS SEPARATION APPARATUS

FIELD OF THE INVENTION

This invention relates to a double ended hollow fiber bundle and to a four port fluids separation device or apparatus for the separation of a fluid component from a feed comprising a mixture of fluids. It also relates to a three port fluids separation device. The term mixture of fluids as used throughout this specification refers to a mixture of liquids and/or a mixture of gases. In one embodiment for countercurrent flow arrangement it Pertains to a fluid separation apparatus that allows for the introduction of the feed into the shell side of the hollow fiber separation apparatus, flow of the feed through the entrance regions into contact with the outside surface of the hollow fiber permselective membrane bundle, removal of permeate component from the open bores at both ends of the hollow fiber membrane bundle and removal of non-permeate component via an extraction tube, the separation being carried out while maintaining a countercurrent flow arrangement along the entire length of the hollow fibers bundle. Further embodiments are also described in this specification.

DESCRIPTION OF THE PRIOR ART

Numerous disclosures exist on the various types of devices used for separating fluid mixtures with hollow fiber membranes. In most fluid separations essentially three streams are present, a feed stream, a permeate stream and a non-permeate stream. Thus the permeator will usually require a total of only three entry and exit ports; however, four ports are occasionally used and the permeate is extracted from two separate ports. As known, use of a single long bundle in a large, longitudinal casing may result in excessive and undesired hollow fiber bore-side pressure drop.

U.S. Pat. No. 3,536,611, issued on Oct. 27, 1990 to R.P. deFilippi, et al., relates to a capillary membrane device in which a net of fibers is woven around a central distributor tube. The feed stream is introduced into the bores of the fibers at one end and the non-permeate is recovered at the opposite end of the bundle. The permeate flows radially to the axis of the distributor tube and no provision is made for cocurrent or countercurrent flows.

U.S. Pat. No. 4,082,296, issued to G.B. Clark on Mar. 4, 1978, describes a hollow fiber permeator in which permeate is withdrawn from two bundles within the same shell. This invention does not teach how permeate can be withdrawn from two ends of the same bundle. Also, only a radial type flow pattern is described.

U.S. Pat. No. 4,622,143, issued on Nov. 11, 1986 to D.W. Edwards, describes a three port permeator in which permeate is extracted from both ends of a fiber bundle. However, there is no indication as to how this module could be used in a cocurrent or countercurrent flow pattern.

U.S. Pat. No. 4,707,267, issued on Nov. 17, 1987 to H.K. Johnson, relates to a fluid separatory device made up of a bundle of hollow fibers which are fastened at each end into a resin tubesheet. The permeate fluid is carried out of the separator through outlets at each end, but only a radial-type flow arrangement is indicated.

A membrane separation apparatus that comprises a hollow fiber bundle is described in U.S. Pat. No. 4,781,834, issued Nov. 1, 1988 to M. Sekino et al. The outer surface of the hollow fiber package is covered by a nonpermeable film except for a small uncovered portion. This arrangement leads to a cocurrent or countercurrent flow pattern. However, the permeate outlet is limited to one end of the bundle only.

U.S. Pat. No. 4,865,736 issued on Sep. 12, 1989 to M.J. Coplan, discloses a hollow fiber separatory module in which an annular hollow fiber bundle is encased within an impervious barrier. While this module can be operated in either a cocurrent or countercurrent flow arrangement, only one end of the bundle can serve as the permeate outlet.

In U.S. Pat. No. 4,881,955, issued on Nov. 21, 1989 to B. Bikson et al., a wound hollow fiber cartridge is described in which the feed fluid enters the bores at one end of the bundle and the non-permeate fluid exits at the opposite end of the bundle. Both cocurrent and countercurrent flow patterns are readily achieved with this design, but the arrangement is limited to boreside feed flow configuration.

U.S. Pat. No. 4,293,419, issued on Oct. 6, 1981 to M. Sekino, et al., describes a hollow fiber assembly in which permeate is withdrawn from two bundles within the same pressure containment vessel. The arrangement is limited to permeate recovery from one bundle end only and radial flow configuration, there is no provision made for countercurrent or cocurrent flow arrangement.

SUMMARY OF THE INVENTION

This invention relates to a double ended hollow fiber bundle and to a fluids separation apparatus (permeator) containing the double ended hollow fiber bundle encased therein. This apparatus can have a total of three or four, preferably four, entry and exit ports, as discussed below. The apparatus comprises a shell enclosing the annular double ended hollow fiber bundle. As used throughout this specification the term "double ended hollow fiber membrane cartridge or bundle" or variant thereof means a bundle of hollow fibers having a tubesheet at both ends with the bores of the hollow fibers open at both ends to allow the removal of permeate fluid. A helically wound hollow fiber membrane bundle or cartridge is the preferred bundle. When the permeator shell contains a total of four entry and exit ports they are a fluid feed entrance port, a non-permeate exit port and two permeate exit ports. When the permeator shell contains a total of three entry and exit ports they are a fluid entrance port, a non-permeate exit port and one permeate exit port. The double ended hollow fiber membrane bundle contains a center core tube, with hollow fibers arranged in a cylindrical shape around the center core. Preferably the hollow fibers are helically wound around the center core. The center core is a hollow tube that has perforations or holes located, preferably, at essentially the center section along the longitudinal length of the center core tube between the two tubesheets, as discussed below. The outer surface of the hollow fiber membranes bundle is tightly encased in an essentially impermeable barrier material placed around essentially the entire longitudinal length of the double ended hollow fiber bundle, except for narrow uncovered entrance regions at both ends of the hollow fiber bundle in the areas adjacent to the tubeheets to permit flow of fluid with the outside surface of the bundle of hollow fibers for contact with the exterior surface of the hollow fibers. The two ends of the hollow fiber membranes bundle are encapsulated in tubesheets with a center core tube extending through one of the tubesheets to permit flow of fluid stream out of the hollow center core tube. Both ends of the hollow fiber membrane bundle are severed to permit flow of fluid through the open bores of the hollow fibers at the two ends embedded in the two tubesheets. The hollow center core tube contains holes or perforations located preferably at the center region between the two tubesheets of the hollow fiber bundle to permit flow of fluid between the hollow core of the tube and the exterior surfaces of the hollow fiber bundle. However, as shown in FIG. 5 the holes or perforations can be located in the regions adjacent to the tubesheets. The assembled double ended hollow fiber membrane bundle is positioned in the pressure shell to form the fluids separation apparatus of this invention. As constructed said double ended bundle is positioned in the shell to provide an annular spacing around the periphery of the impermeable barrier-wrapped exterior surface of said bundle and the interior surface of said shell to permit flow of fluid therebetween. All of the above is hereinafter described in more detail.

THE DRAWINGS

FIG. 1A is a cross-sectional view along line A—A to illustrate in more detail the structural configuration of flow port 30.

DETAILED DESCRIPTION OF THE INVENTION

Figure 1:
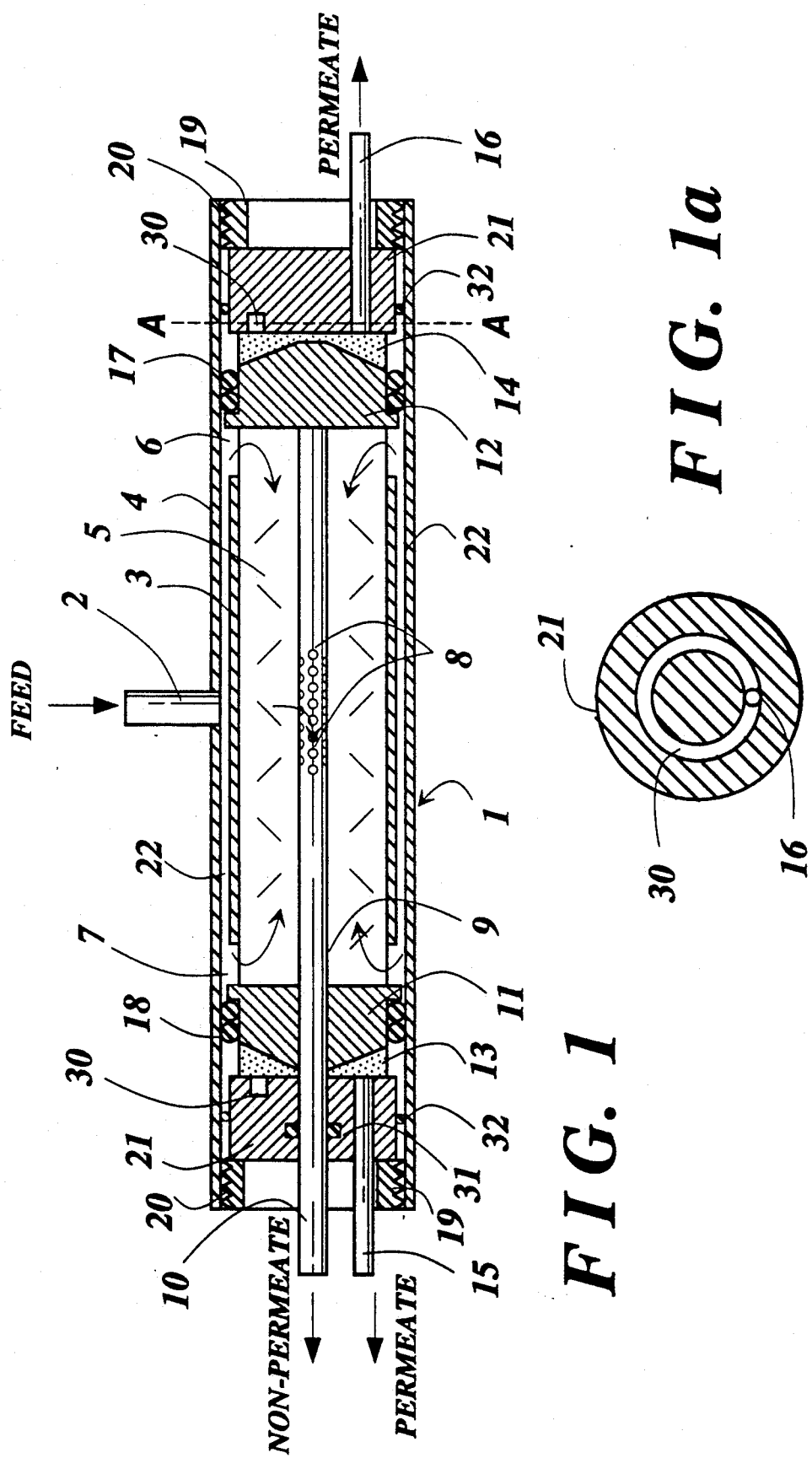
FIG. 1 is a sectional view of an embodiment of a double ended fluids separation apparatus in accordance with the present invention wherein feed fluid is introduced on the hollow fiber shell side and countercurrent flow arrangement is maintained.

This invention provides a double ended hollow fiber bundle and a fluids separation device or permeator for use in a fluid separation process. The fluids separation device contains three or four ports in the shell for the entry and exit of the fluid streams. Important features of this fluids separation device are the positioning of the essentially impermeable barrier that encases the bundle of hollow fibers and the open bores of the hollow fibers at both ends of the double ended hollow fiber bundle.

The fluids separation device, as assembled, consists of the pressure shell and the annular double ended hollow fiber membrane bundle or cartridge housed therein. The shell is preferably cylindrical and preferably contains four ports for the entry and exit of fluid streams. When the double ended hollow fiber membrane bundle is produced by wrapping the hollow fibers around a hollow center core tube followed by opening both ends of the hollow fibers, the assembled double ended hollow fiber membrane bundle fluid separation apparatus has four ports as illustrated in FIGS. 1 to 5. As shown in FIGS. 1 to 4 the hollow center core tube 9 has perforations located at essentially the center section thereof between the tubesheets to permit flow of the fluid between the hollow core of this tube and the area around the exterior surfaces of the hollow fibers. A first port for entry of the fluid feed stream, a second port for the exit of the non-permeate stream and third and fourth ports for the exit of the permeate stream. As shown in FIG. 5 the perforations are located adjacent to the two tubesheets.

The double ended fluids separation apparatus of this invention can achieve essentially the same separation result of prior art hollow fiber membrane bundles with permeate removal from one end only. Advantageously longer bundles of equal performance can be constructed, or bundles of equal length that exhibit better performance due to lower bore flow resistance are obtained when utilizing double ended bundles of this invention. The invention as shown in FIGS. 1 to 5 allows for the permeate fluid to be withdrawn at both ends of the hollow fiber membrane bundle while maintaining either a countercurrent or cocurrent flow pattern, respectively.

The apparatus of this invention has a single cartridge or bundle open at both ends permitting removal of permeate at both ends. Although it is a single bundle the feed entering the cartridge in FIGS. 1, 3 and 4 splits into two streams before the non-permeate is collected in center core tube 9; in FIG. 5 the feed enters as a single stream. In this module both ends of the cartridge operate at essentially the same stage cut when the permeate streams are removed at the same pressure. It should be noted that if holes 8 in FIGS. 1 to 4 are shifted to any significant degree to either side then both ends of the cartridge will not operate at the same stage cut. Stage cut is defined as the ratio of permeate flow to feed flow.

The double ended hollow fiber membrane bundle contains a center core tube, hollow fiber membranes arranged circularly around the core tube, preferably helically wound around the exterior of the center core, and an essentially impermeable, preferably flexible, barrier comprised of one or more layers of thin film tightly wrapped around essentially the entire longitudinal length of the exposed hollow fibers of the bundle except for narrow uncovered portions at both ends of the bundle adjacent to the tubesheets in FIGS. 1 to 4 and about midway between the two tubesheets in FIG. 5. Both ends of said bundle are encapsulated in tubesheets with the hollow center core tube opening out of one tubesheet to permit the flow of fluid in or out of the hollow center core tube. The tubesheets are severed and the bores of the hollow fibers are opened at both ends with the hollow fiber bores positioned in communication with adjacent chambers, all as more fully described hereinafter. As is known, the tubesheets can be severed at an angle or flat to expose or open the bores of the hollow fibers and then the severed tubesheets are generally supported by an appropriate flow distributor plate, sometimes this is a porous plate. The core tube disposed within the bundle is constructed and arranged such that its interior and the shell side of the permeator do not communicate with the chambers in communication with the open ends of the hollow fibers. In the drawings the core tube is shown to be continuous and extending through the tubesheets; however, it is understood that the core tube can be constructed from several interconnected tubes in flow tight relationship provided by 0-rings or threads. Such arrangement might, sometimes, be advantageous for ease of installation. By the term "exposed hollow fibers" is meant the entirety of hollow fibers located between the inner surfaces of the two tubesheets.

The center core is a hollow tube with openings or holes to permit flow of fluid between the exterior surface of the hollow fibers and the interior core of the center core tube. The size and number of these openings is dependent upon the size of the cartridge and gas flow velocity on the shell side; they are preferably located at essentially the center section of the tube along the longitudinal length between the two tubesheets as shown in FIGS. 1 to 4. The openings can be in the form of drilled holes, cut slots or other perforations. The cross-sectional area occupied by the holes is essentially determined by pressure drop requirements and preferably kept to acceptable minimum cross-section and, as shown in FIGS. 1 to 4, the holes are preferably positioned essentially centrally between the tubesheets to insure optimum flow dynamics. The center core tube can be made from any non-permeable material, metal, glass, wood, plastic, composite laminate, and the like.

The essentially impermeable barrier of one or more layers placed around the double ended hollow fiber bundle has to be in intimate contact with the exterior of the double ended bundle throughout essentially the entire exposed hollow fiber length that is in contact with the barrier. The close contact is required to prevent channeling or bypassing of the active surface areas of the hollow fiber membranes by the fluid stream. This arrangement can also be accomplished through molding or deposition of liquid curable resin to the exterior of the bundle, the resin sometimes being further reinforced by an external shell or braid. In one embodiment of this invention, the impervious barrier is a thin plastic film that is wrapped tightly around the bundle and conformed to bundle dimensions.

The essentially impermeable flexible film wrap or film barrier can be of any composition, for example, a thin film of a polyolefin or of polyvinylidene chloride. The impervious film can be, further, an impervious coating material applied from innocuous solvent. Alternatively the impervious barrier can be placed by shrinking a plastic shrink sleeve around the exterior surface of the bundle. It can be applied before the tubesheets are formed, if desired, or it can be applied to the bundle of hollow fibers after the tubesheets have been formed. As indicated the flexible film wrap does not cover the entire surface of the bundle of hollow fibers, the entrance region areas of the double ended hollow fiber bundle encased within the tubesheets are left uncovered to provide for entrance or exit of fluids. These uncovered regions can be of variable width but generally are from about one percent or lower to up to about 10 percent of the longitudinal length included between the two tubesheets, preferable from about one to about five percent. For optimal flow dynamic performance, the gap should be kept to minimum dimensions, the dimensions further determined by minimum pressure drop requirements since an excessively narrow gap can induce severe pressure drop.

Hollow fibers to be utilized in the double ended hollow fiber membrane bundle fluids separations device of this invention depend upon the particular separation process to be undertaken. Their preparation and their compositions are well known to those of ordinary skill in the art. Though most of the discussion in this document refers to composite membranes, one can use either a dense wall, porous, asymmetric or composite membrane in constructing the double ended hollow fiber membrane fluid separation apparatus. This invention provides a permeator that uses hollow fiber membrane bundles having open bores at both ends of the hollow fiber bundle. In using the permeator of this invention, a countercurrent flow or cocurrent flow can be maintained between the feed and the permeate. For gas separation applications the countercurrent flow configuration is frequently the more desirable flow arrangement.

An annular shaped hollow fiber bundle is produced by winding individual hollow fibers in a helical pattern around a hollow center core tube. The center core tube is perforated typically with at least one row of holes at a point which is located at what would essentially be the center section thereof after the tubesheets have been formed at each end to permit exit or entry of fluid as shown in FIGS. 1 to 4 or the holes are located adjacent to the tubesheets as shown in FIG. 5. The bundle is then encased in the impermeable barrier as herein described.

The methods by which hollow fibers are wound around a center core mandrel are well established in the art, as are the methods and materials used to form the tubesheets and methods to sever the tubesheets to expose hollow fiber bores. The hollow fibers are severed by cutting slots or notches in the tubesheets. However, the tubesheets can be severed by creating a flat surface by techniques known in the art and then supported with a porous plate or other means.

It was found that the hollow fibers can be wound around the center core at angles up to 20°, and below, while still retaining countercurrent flow behavior. A 0° angle is defined as perpendicular to the center core tube. It would commonly be expected that for countercurrent flow behavior to be displayed, the shell side fluid has to flow tangentially to the hollow fibers in a countercurrent flow arrangement. Thus it is surprising that the hollow fibers can be arranged at a substantial angle to the shell side flow direction with countercurrent flow behavior still displayed by the permeator. The winding angles in a bundle are frequently determined by pressure drop requirements on the bore side of the permeation. To decrease pressure drop of the fluid along hollow fiber bores, the fibers are frequently would at angles of 45° and higher.

The production of permeable hollow fibers and the materials used for their production are well known. Such hollow fibers are readily produced by the procedure described by I. Cabasso, "Hollow Fiber Membranes", Kirk-Othmer: Enc. of Chem. Tech., 12, Third Ed., 492-517 (1980) and I. Cabasso, 509-579 (1987), incorporated herein by reference. Many hollow fibers are known to be porous with channels for fluid flow existing between the exterior and interior surfaces of the hollow fibers. The pores generally have an average cross-sectional diameter less than about 200,000 Ångstroms and in some porous hollow fibers the average pore cross-sectional diameter is less than about 50,000 Ångstroms or about 10,000 Ångstroms; in some instances, the average pore cross-sectional diameter can be as small as about 5 to about 200 Ångstroms. Depending upon the intended use (e.g., gas-gas, liquid-liquid, microfiltration, ultra-filtration, etc.) one selects hollow fibers having the appropriate pore diameter sizes.

Advantageously the walls of the hollow fibers are sufficiently thick so that no special apparatus would be required for their handling. The outside diameter of the hollow fiber can vary from about 1 mil or less to about 100 mils or more, preferably from about 2 mils to about 80 mils. The wall thickness of the hollow fiber can vary from about 0.1 mil to about 12 mils or more, preferably at least about 0.2 mil up to about 20 mils.

In order to provide a desirable flux through the porous hollow fiber, particularly those hollow fibers having walls at least about 2 mils in thickness, hollow fibers having a substantial void volume are beneficially used. Voids are regions within the hollow fibers that are vacant of the material of the hollow fibers. Thus when voids are Present, the density of the hollow fiber is less than the density of the bulk material of the hollow fibers. The void volume of the hollow fiber can be as high as 90 percent, or can be from about 10 percent to 80 percent, and sometimes about 20 to about 70 percent, based on the superficial volume, i.e., the volume contained within the gross dimensions of the hollow fiber, excluding the bore volume.

In many instances the hollow fiber is in the form of a composite membrane with a thin membrane-forming material applied to the surface of the porous hollow fiber. These can be produced by any of the known procedures, e.g., as shown in U.S. Pat. No. 4,467,001, wherein the solution of the membrane-forming material is applied to deposit a finished dry coating up to about 7,000 Ångstroms, preferably from about 500 to about 2,000 Ångstroms adhered to the exterior surface of the porous hollow fiber. In some instances adhesion is prompted by coupling agents and/or chemical treatment.

The double ended hollow fiber bundle of this invention is installed into a pressure shell to provide a novel fluids separation apparatus as shown in FIGS. 1 through 5. The fluids separation apparatus containing the double ended hollow fiber bundle is typically equipped with a feed entrance port, non-permeate exit port, and two permeate exit ports. However, an alternative arrangement can be provided wherein the permeate is extracted from both ends of the double ended hollow fiber bundle of this invention and then discharged at one end of the double ended hollow fiber bundle fluids separation apparatus. The arrangements like this are well known in the art, for example, as described by D.W. Edwards in U.S. Pat. No. 4,622,143.

FIG. 1 shows a sectional view of an embodiment of a double ended fluids separation apparatus 1 of this invention, which comprises the pressure shell 4, hollow fiber membrane bundle 5, center core tube 9, impermeable barrier 3 and tubesheets 11 and 12. The figure also shows first port 2, second port 10, third port 15 and fourth port 16. Also shown are holes 8 in center core tube 9, the uncovered entrance regions 6 and 7 of hollow fiber membrane bundle 5, hollow fiber bore openings 13 and 14, e.g. in the form of slots or notches, in the tubesheet, O-rings 17 and 18, threaded ring 19, threads 20, cylindrical plugs 21 and annular space 22.

In a typical embodiment of the use of the equipment illustrated by FIG. 1, the fluid feed stream, for example air, enters the double ended fluids separation apparatus 1 via first port 2, which can be positioned in the pressure shell 4 at a point about midway between tubesheets 11 and 12. An impermeable barrier (for example, a thin film such as polyethylene or polyvinylidene chloride) 3 forces the fluid feed stream to travel along the annular space 22 between the double ended fluid separation device's pressure shell 4 and the impermeable barrier 3. The fluid feed stream initially comes into contact with the exterior surface of the hollow fibers membrane bundle 5 at the entrance regions 6 and 7, said hollow fiber membranes comprising, for example, a composite membrane of porous polysulfone hollow fibers having a very thin coating layer of the sulfonated polysulfone. The fluid feed stream flows along the exterior surface of the hollow fibers of the double ended hollow fibers membrane bundle 5 and exits through holes 8 of center core tube 9. Center core tube 9 extends through tubesheet 11 allowing the non-permeating fluid stream to leave the permeator at non-permeate second port 10. Permeate fluid flows through the bores of the hollow fibers countercurrent to the feed (non-permeate) stream and exits the hollow fiber bores at hollow fiber bore openings 13 and 14, the hollow fibers being embedded in tubesheets 11 and 12, and exits the permeator at third and fourth ports 15 and 16. O-rings 17 and 18 act as a fluid tight seal to separate the high and low pressure sides of the permeator, in essence also separating the fluid feed stream and non-permeate stream from the permeate stream.

First port 2 need not necessarily be positioned to introduce fluid feed at the center of pressure shell 4 if annular space 22 is wide enough to permit free flow without any build-up of pressure in annular space 22; preferably, however, first port 2 is essentially at the center.

When pressurized fluid feed is introduced on the shell side of the hollow fiber bundle, the pressure force acting against the backside of each tubesheet 11 and 12 tends to deflect each tubesheet if there is no balancing force on the front side. To prevent potential deflection of the tubesheets, a physical support in contact with the front side of each tubesheet is employed. In FIG. 1, threaded ring 19 engages permeator pressure shell 4 by threads 20 (as described in U.S. Pat. No. 4,709,831) to retain cylindrical plugs 21 and counterbalance the pressure force.

The entrance and exits of the fluid streams may be reversed. For example, fluid feed stream can be charged into port 10 with non-permeate stream exiting at port 2, permeate streams exiting at ports 15 and 16 as shown in FIG. 2.

Figure 2:
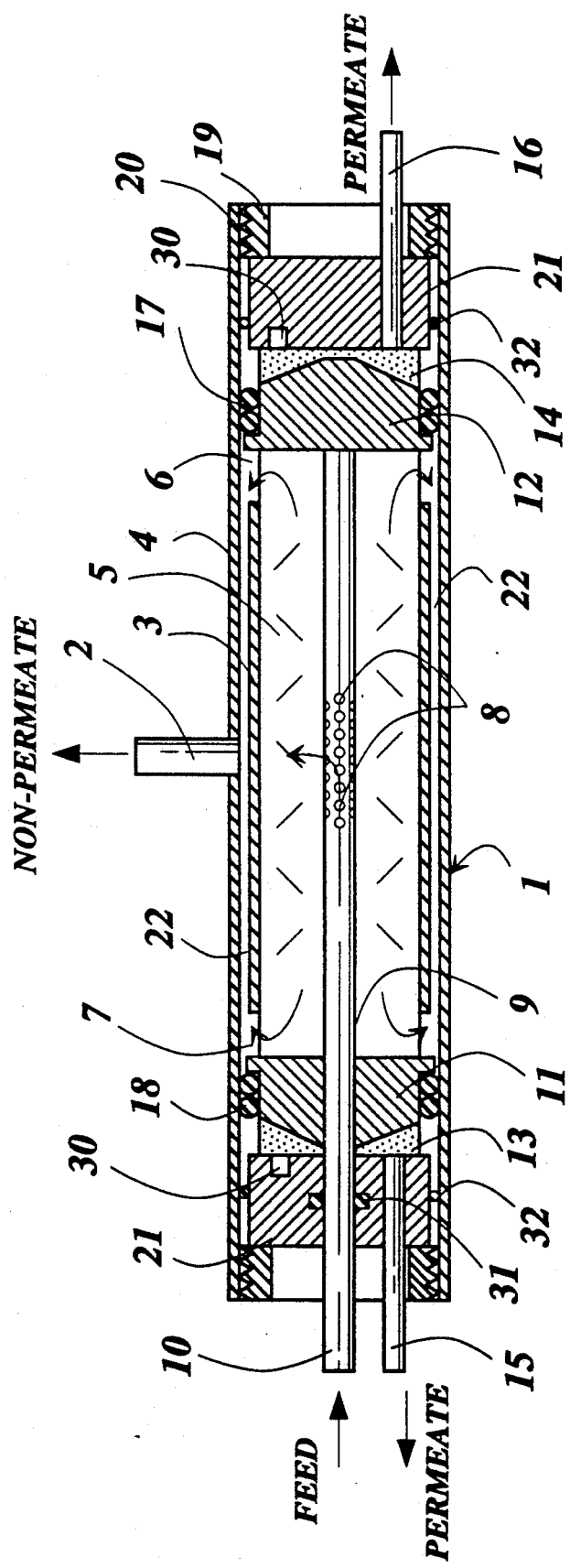
FIG. 2 is a sectional view of an embodiment of a double ended fluids separation apparatus in accordance with the present invention illustrating a cocurrent flow arrangement.
Figure 3:
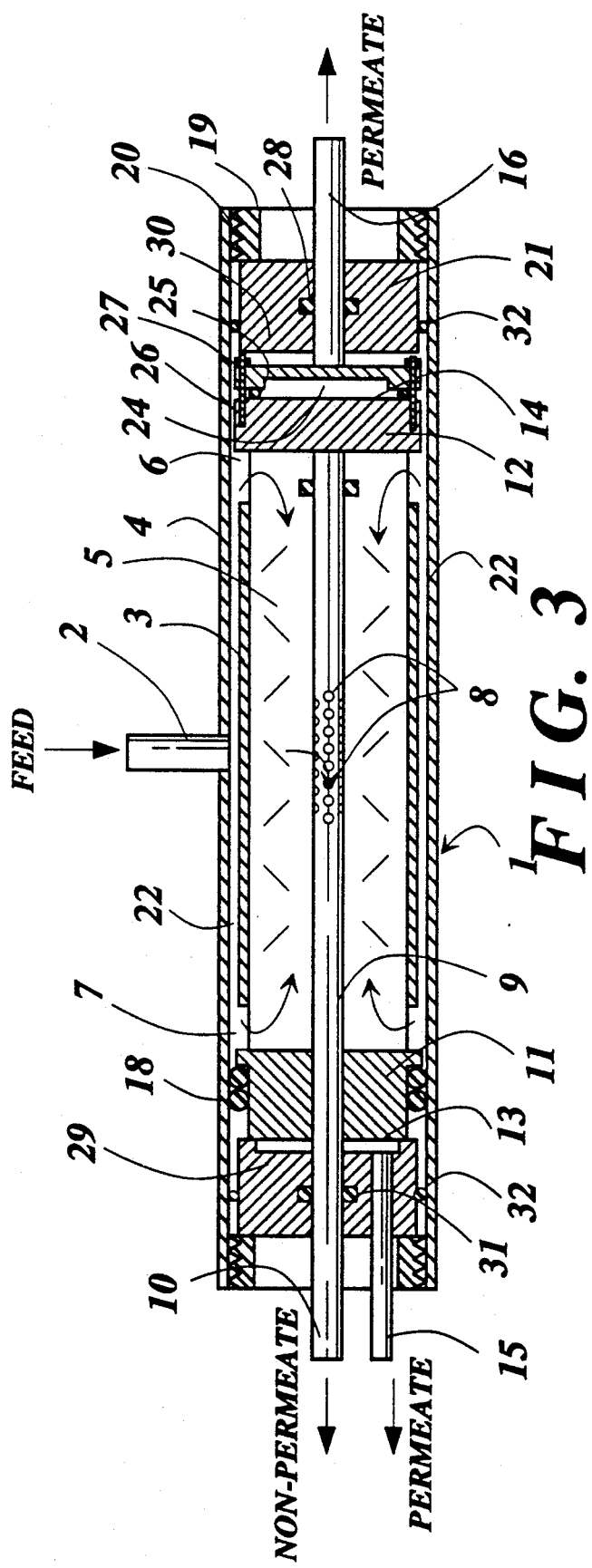
FIG. 3 is a sectional view of an alternative embodiment of FIG. 1 in which the tubesheet supports and permeate collection arrangement has been modified.
Figure 4:
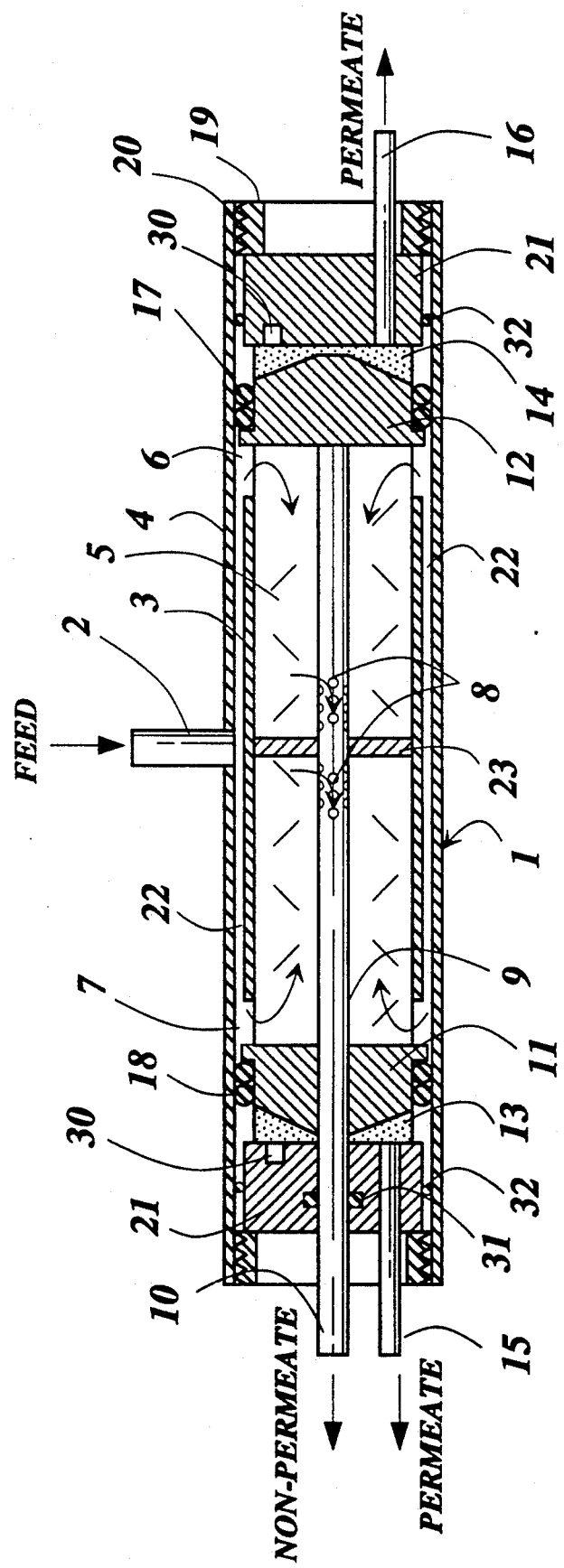
FIG. 4 is a sectional view of another alternative embodiment of FIG. 1 in which a barrier exists between the right and left sides of the double ended hollow fiber bundle.
Figure 5:
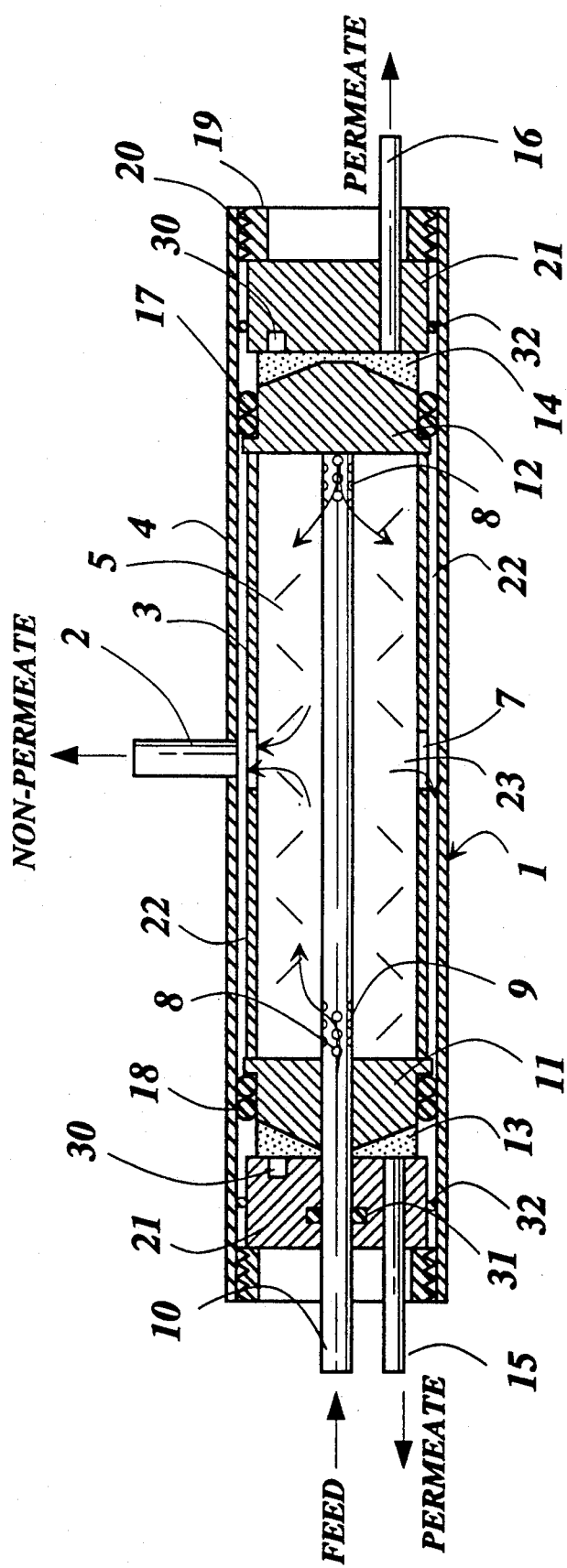
FIG. 5 is a sectional view of an embodiment of a fluids separation apparatus containing a double ended hollow fiber bundle in accordance with the present invention wherein the holes or perforations in the center core tube are located in the regions adjacent to the two terminal tubesheets and the entrance region of the impermeable barrier is located midway between the two tubesheets.

FIGS. 3 and 4 show alternate constructions of the double ended hollow fibers fluids separation apparatus of this invention in which holes 8 in the center core tube 9 and entrance regions 6 and 7 are located in the similar positions shown in FIGS. 1 and 2.

In the assembly shown in FIG. 3 the hollow fiber membrane bundle 5 is mounted in the pressure shell by means different than shown in FIG. 1. In FIG. 3 there is a permeate containment plate 24 retained by means of a gasket 25, bolts 26 and nuts 27. O-rings 28 and 32 form an impervious seal for cylindrical plug 21 and O-rings 31 and 32 form an impervious seal for end plug 29.

In the embodiment shown in FIG. 3 the tubesheets 11, 12 on both ends of hollow fiber membrane bundle 5 are shown cut flat and the hollow fiber ends are exposed on the end faces 13, 14 of tubesheets 11, 12. The end plug 29 supports tubesheet 11 at its perimeter to allow permeate gases to collect for recovery via third port 15.

In the assembly shown in FIG. 4 the hollow fiber membrane bundle 5 has been modified by the presence of a barrier 23 located at about the mid-point of the bundle. Inclusion of barrier 23 can be useful in decreasing shell side fluid mixing near extraction holes 8. The construction of barrier 23 in a hollow fiber bundle is known to those of ordinary skill in the art and can be formed, for example, by deposition of a polymer at the desired point during the winding. This polymer can be in the form of a heated thermoset fluid polymer at a temperature which does not have an adverse effect on the hollow fiber structures or in the form of a curable polymer composition that is subsequently treated to solidify and form solid barrier 23, e.g., an epoxy resin.

In the embodiment shown in FIG. 5, the hollow fiber bundle 5 is covered with impervious barrier 3 except for the narrow exposed entrance region 7 which is located midway between the two tubesheets 11 and 12 and the holes 8 in the center core pipe 9 are located adjacent to the two terminal tubesheets 11 and 12. The impervious barrier 3 can be a thin plastic sheet such as polyethylene film or a reinforced epoxy composite, the latter may be preferential if high fluid flow rates through the bundle generate a significant pressure drop. The fluid flows into the entrance port 10, travels along the length of the center core tube 9, and flows into the fiber membrane bundle matrix 5 via holes 8. The resistance to flow along the center core tube 9 should be small enough so that the flow of the fluid into the hollow fiber membrane bundle 5 is equally distributed through the two sets of holes 8. Permeate fluid flows through the bores of the hollow fibers and exits the hollow fiber bores at hollow fiber bore openings 13 and 14 and then exits the permeator through ports 15 and 16. Fluid which has not permeated the fiber exits the fiber bundle through bundle exit region 7 and then through non-Permeate port 2. The flow pattern indicated in FIG. 5 is countercurrent with respect to the permeate flow relative to the non-permeate flow. However, the entrance and exit of the feed fluid and non-permeate fluid streams may be reversed to provide for cocurrent flow arrangement.

The double ended hollow fiber fluids separation bundle and the permeator apparatus of this invention are used for separating and enriching a first component from a fluids mixture thereof with at least one other component of said mixture or dehydrating mixtures of two or more liquid or gaseous mixtures. Typical multicomponent fluids mixtures that can be separated with the bundles and apparatus of this invention one can mention $He/N_2$, air, $CO_2/CH_4$, $He/CH_4$, $O_2/N_2$, $H_2/CO_2/CO/N_2$, $CH_4/CO_2/H_2S$, $CO/H_2$, $H_2/CH_4$, $He/CH_4/N_2$, $He/O_2/N_2$, $N_2/H_2$, $N_2/CH_4$, $H_2O/O_2/N_2$; also included are many other compositions known to those skilled in the art as being capable of being separated by membrane permeation techniques.

What is claimed is:

1. A fluids separation apparatus containing a hollow fiber membrane bundle, wherein permeate fluid can be withdrawn from both ends of the hollow fiber bundle while maintaining either concurrent or countercurrent fluid flow throughout the bundle, comprising:

means for enabling withdrawal of permeate fluid from both ends of the hollow fiber membrane bundle, and for enabling the introduction of feed fluid to the external surface of the hollow fibers, from an external fluid feed port, or through the center core tube, for either co-current or countercurrent flow across the hollow fiber bundle, including, (a) a shell enclosing the hollow fiber membrane bundle, said shell having a fluid feed port, a non-permeate fluid port, and at least one permeate fluid exit port; and (b) an annular double ended hollow fiber membrane bundle comprising:

(i) a center core tube having perforated holes in the wall thereof located at selected points along the longitudinal length of said center core tube, said perforated holes being adapted to permit the flow of feed fluid from within said one tube to the exterior surface of the hollow fibers, or to permit the flow of non-permeate gas from the exterior surface of the hollow fibers into said core tube;

(ii) a hollow fiber bundle in a cylindrical shape positioned around the exterior of the center core tube, with the hollow fibers extending essentially the length of the interior of the shell with both ends of the fibers embedded in, and extending between and through, tubesheets in fluid tight relationship thereto, with the open bores of the hollow fibers opening on the exterior surfaces of said tubesheets for withdrawal of permeate from both ends of the hollow fiber bundle;

(iii) an essentially impermeable film barrier encasing the entire longitudinal length of the exposed hollow fibers of the hollow fiber bundle between the tubesheets, except for selected non-encased circumferential regions adapted to direct the flow of feed fluid to the exterior surface of the hollow fibers from a shell fluid feed port, or to permit the flow of non-permeate gas from the exterior surface of the hollow fibers to a shell non-permeable fluid port, said non-encased circumferential regions being adapted, together with the position of the perforated holes in the wall of the of the center core tube, to enable the flow of gas along the exterior surfaces of the hollow fibers of the hollow fiber bundle between the tubesheets to be in either concurrent or countercurrent flow with respect to the flow of gas within the center core tube; and (iv) tubesheets encapsulating both ends of said bundle, with the center core tube extending and communicating through one of said tubesheets to permit the flow of feed fluid or non-permeate gas therethrough, with said hollow fiber membrane bundle positioned within the shell in fluid tight relationship between the shell and the bore sides of said hollow fiber bundle.

2. A fluids separation apparatus as claimed in claim 1 wherein said center core perforated holes are located at the center section of the longitudinal length of the core spaced between the two tubesheets and said impermeable barrier encases the entire longitudinal length of said bundles between the two tubesheets except for non-encased circumferential regions near both ends of said bundle in the areas essentially adjacent to the tubesheets.

3. A fluids separation apparatus as claimed in claim 2, said apparatus having a single permeate fluid exit port.

4. A fluids separation apparatus as claimed in claim 2, said apparatus having two permeate fluid exit ports.

5. A fluids separation apparatus as claimed in claim 1 wherein said center core perforated holes are located near both ends of said bundle in the areas essentially adjacent to the two tubesheets and said impermeable barrier encases the entire longitudinal length of said bundle between the two tubesheets except for a non-encased circumferential region at the center section of the longitudinal length of the core spaced between the two tubesheets.

6. A fluids separation apparatus as claimed in claim 5, said apparatus having a single permeate fluid exit port.

7. A fluids separation apparatus as claimed in claim 5, said apparatus having two permeate fluid exit ports.

8. A double ended hollow fiber fluids separation apparatus as claimed in claim 1 wherein the annular hollow fiber bundle is produced by winding the hollow fibers around a mandrel.

9. A double ended hollow fiber fluids separation apparatus as claimed in claim 8 wherein the mandrel is the center core tube of the permeator.

10. A double ended hollow fiber fluids separation apparatus as claimed in claim 1 further comprising seals located between the potting composition and the pressure resistant shell.

11. A double ended hollow fiber fluids separation apparatus as claimed in claim 1 comprising an annular spacing between said shell and said impermeable film barrier.

12. A double ended fluids separation device as claimed in claim 1 wherein said essentially impermeable film barrier comprises one or more layers of plastic film.

13. A fluids separation apparatus as claimed in claim 1, said apparatus having a single permeate fluid exit port.

14. A fluids separation apparatus as claimed in claim 1, said apparatus having two permeate fluid exit ports.

15. A process for separating and enriching a first component from a fluids mixture thereof such at least one other component of said mixture, comprising:
enabling withdrawal of permeate gas from both ends of the hollow fiber membrane bundle, with the fluids mixture being introduced to the external surface of the hollow fibers from an external fluid feed port or through the center core tube, for either co-current or countercurrent flow across the hollow fiber bundle, by
(a) feeding said fluids mixture into a fluids separation apparatus through a feed port, said fluids separation apparatus comprising:
(1) a shell enclosing a hollow fiber membrane bundle, said shell having a fluid feed port, a non-permeate fluid port, and at least one permeate fluid exit port; and
(2) an annular double ended hollow fiber membrane bundle comprising:
(i) a center core tube having perforated holes in the wall thereof located at selected points along the longitudinal length of said center core tube, said perforated holes being adapted to permit the flow of feed fluid from within said center core tube to the exterior surface of the hollow fibers, or to permit the flow of non-permeate gas from the exterior surface of the hollow fibers into said center core tube;
(ii) a hollow fiber bundle in a cylindrical shape positioned around the exterior of the center core tube, with the hollow fibers extending essentially the length of the interior of the shell with both ends of the fibers embedded in, and extending between and through, the tubesheets in fluid tight relationship thereto, said hollow fibers being capable of selectively permeating said first component, with the open bores of the hollow fibers opening on the exterior surfaces of said tubesheets for withdrawal of permeate from both ends of the hollow fiber bundle;
(iii) an essentially impermeable film barrier encasing the entire longitudinal length of the exposed hollow fibers of the hollow fiber bundle between the tubesheets, except for selected non-encased circumferential regions adapted to direct the flow of feed fluid to the exterior surface of the hollow fibers from a shell fluid feed port, or to permit the flow of non-permeate gas from the exterior surface of the hollow fibers to a shell non-permeable fluid port, said non-encased circumferential regions being adapted, together with the position of the perforated holes in the wall of the center core tube, to enable the flow of gas along the exterior surfaces of the hollow fibers of the hollow fiber bundle between the tube sheets to be in either concurrent or countercurrent flow path with respect to the flow of gas within the center core tube; and
(iv) tubesheets encapsulating both ends of said bundle, with the center core tube extending and communicating through one of said tubesheets to permit the flow of feed fluid or non-permeate gas therethrough, with said hollow fiber membrane bundle positioned within the shell in fluid tight relationship between the shell and the bore sides of said hollow fiber bundle;
(b) removing non-permeate gas from the fluids separation apparatus through a non-permeate port; and
(c) recovering said first component permeate gas through at least one permeate recovery port.

16. A process as claimed in claim 15 wherein said center core perforated holes are located at the center section of the longitudinal length of the core spaced between the two tubesheets and said impermeable barrier encases the entire longitudinal length of said bundles between the two tubesheets except for non-encased circumferential regions near both ends of said bundle in the areas essentially adjacent to the tubesheets.

17. A process as claimed in claim 16 wherein said fluids separation apparatus has a single permeate fluid exit port.

18. A process as claimed in claim 16 wherein said fluids separation apparatus has two permeate fluid exit ports.

19. A process as claimed in claim 15 wherein said center core perforated holes are located near both ends of said bundle in the areas essentially adjacent to the two tubesheets and said impermeable barrier encases the entire longitudinal length of said bundle between the two tubesheets except for a non-encased circumferential region at the center section of the longitudinal length of the core spaced between the two tubesheets.

20. A process as claimed in claim 19 wherein said fluids separation apparatus has a single permeate fluid exit port.

21. A process as claimed in claim 19 wherein said fluids separation apparatus has two permeate fluid exit ports.

22. A process as claimed in claim 15 wherein said fluids separation apparatus has a single permeate fluid exit port.

23. A process as claimed in claim 15 wherein said fluids separation apparatus has two permeate fluid exit ports.

24. A process as claimed in claim 15 wherein said first component is oxygen.

25. A process as claimed in claim 15 wherein said first component is hydrogen.

26. A process as claimed in claim 15 wherein said fluids mixture comprises oxygen and nitrogen.

27. A process as claimed in claim 15 wherein said fluids mixture is air.

28. An annular double ended hollow fiber bundle comprising:

means for enabling the hollow fiber bundle to be adapted for withdrawing permeate gas from both ends thereof, and for the introduction of feed fluid to the external surface of the hollow fibers from an external fluid feed port, or through the center core tube, for either co-current or countercurrent flow across the hollow fiber bundle, including, (a) a center core tube having perforated holes in the wall thereof located at selected points along the longitudinal length of said center core tube, said perforated holes being adapted to permit the flow of feed fluid from within said core tube to the exterior surface of the hollow fibers, or to permit the flow of non-permeate gas from the exterior surface of the hollow fibers into said core tube;

(b) a hollow fiber bundle in a cylindrical shape positioned around the exterior of the center core tube, with both ends of the hollow fibers embedded in, and extending between and through, terminal tubesheets in fluid tight relationship thereto, with the open bores of the hollow fibers opening on the exterior surfaces of said tubesheets for withdrawal of permeate from both ends of the hollow fiber bundle;

(c) an essentially impermeable film barrier encasing the entire longitudinal length of the exposed hollow fibers of the hollow fiber bundle between the tubesheets, except for selected non-encased circumferential regions adapted to direct the flow of feed fluid to the exterior surface of the hollow fibers, or to permit the flow of non-permeate gas from the exterior surface of the hollow fibers, said non-encased circumferential regions being adapted, together with the position of the perforated holes in the wall of the center core tube, to enable the flow of gas along the exterior surfaces of the hollow fibers of the hollow fiber bundle between the tubesheets to be in either cocurrent or countercurrent flow with respect to the flow of gas within the center core tube; and (d) tubesheets encapsulating both ends of said bundle, with the center core tube extending and communicating through one of said tubesheets to permit the flow of feed fluid or non-permeate gas therethrough.

29. An annular double ended hollow fiber bundle as claimed in claim 28 wherein said film barrier encases the entire longitudinal length of the bundle between the tubesheets except for a non-encased circumferential entrance region about midway between the two terminal tubesheets of said bundle and said center core tube having said perforations located adjacent to the two terminal tubesheets.

* * * * *